A parameter α(OUT) having an accelerator pedal position, a vehicle speed and a drive force as components is set according to information representing a driver's operation and information representing running environment of a vehicle. A gear is set according to the parameter α(OUT) and a map determining the gear based on the accelerator pedal position, the vehicle speed and the drive force. A gear shift line is defined such that a rate of increase of the drive force with respect to the vehicle speed is zero or more. A down-shift line is defined such that the drive force decreases with increase in accelerator pedal position. Down-shift after up-shift as well as the up-shift after the down-shift are inhibited when both a condition that an amount of change of the accelerator pedal position after last gear shift is larger than a threshold and a condition that an amount of change of the drive force after the last gear shift is larger than the threshold are satisfied.

4 Claims, 17 Drawing Sheets

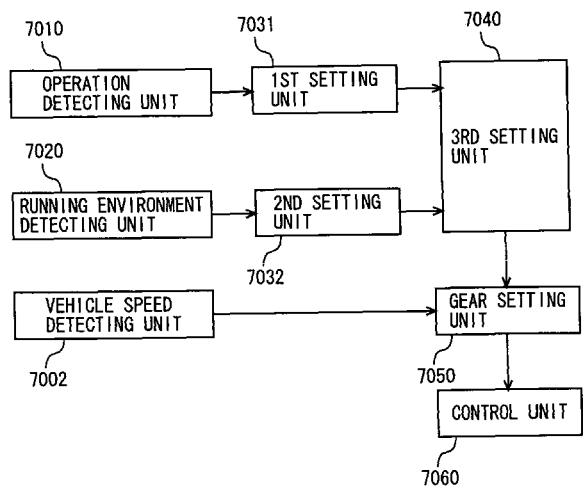

U.S. PATENT DOCUMENTS

| | | | |
|---|---|---|---|
| 6,671,601 B2 * | 12/2003 | Abiru | 701/51 |
| 6,754,563 B1 * | 6/2004 | Ebeling et al. | 701/1 |
| 7,021,410 B2 * | 4/2006 | Hughes | 180/65.25 |
| 7,206,689 B1 * | 4/2007 | Johnson | 701/103 |
| 7,678,015 B2 * | 3/2010 | Funke et al. | 477/43 |
| 2002/0013650 A1 * | 1/2002 | Kusafuka et al. | 701/51 |

FOREIGN PATENT DOCUMENTS

| | | |
|---|---|---|
| JP | A-07-277038 | 10/1995 |
| JP | A-09-126307 | 5/1997 |
| JP | A-10-157491 | 6/1998 |
| JP | A-10-246325 | 9/1998 |
| JP | A-11-235939 | 8/1999 |

* cited by examiner

F I G. 3
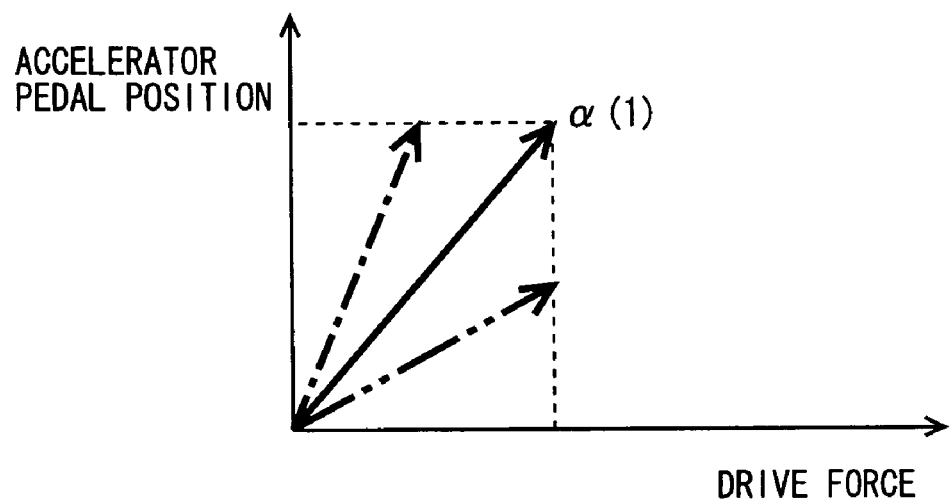
F I G. 4
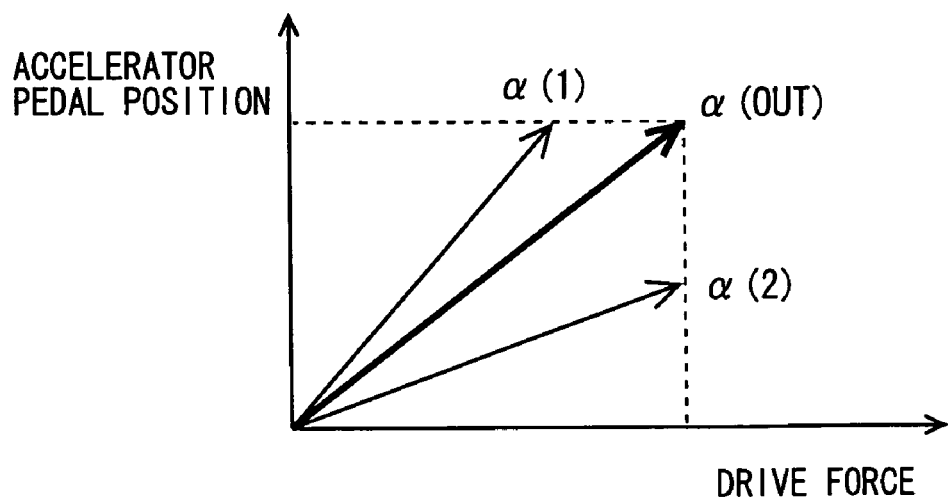

GEAR SHIFT SYSTEM FOR VEHICLE, CONTROL METHOD AND CONTROL DEVICE FOR AUTOMATIC TRANSMISSION

This nonprofessional application is based on Japanese Patent Application No. 2007-180575 filed on Jul. 10, 2007 with the Japan Patent Office, the entire contents of which are hereby incorporated by reference.

BACKGROUND OF THE INVENTION

1. Field of the Invention

The present invention relates to a gear shift system for a vehicle as well as a control method and a control device for an automatic transmission, and particularly to a technique for controlling a gear ratio of an automatic transmission.

2. Description of the Background Art

A vehicle equipped with an automatic transmission has been known. In general, a gear ratio of the automatic transmission is determined according to an accelerator pedal position and a vehicle speed. For setting the gear ratio more finely, it is preferable to give consideration to running environment (a gradient of a road surface, a curvature of the road surface, a friction coefficient of the road surface, a degree of traffic jam and a type of the road) of the vehicle and the like as well as an accelerator pedal position and a vehicle speed.

Japanese Patent Laying-Open No. 9-126307 has disclosed a gear shift control device of an automatic transmission including a deceleration state determining unit determining a deceleration state of a vehicle, a deceleration gear setting unit for setting gears within gear selection ranges of different drive state parameters, respectively, based on the plurality of drive state parameters when deceleration determination is performed, and a gear shift control unit performing gear shift control by determining, as the gear, a lowest gear among the plurality of gears that are set by the deceleration gear setting unit.

According to the gear shift control device described in the above publication, the selection range of the gear for each parameter is different from those for the other parameters in the deceleration state. Therefore, such a structure is employed, e.g., that a second gear is selected for one parameter, but a third gear is selected as the lowest gear for another parameter. Thereby, it is possible to reduce the number of times that the second gear is finally selected, and the excessive engine braking can be avoided.

However, the gear shift control device disclosed in Japanese Patent Laying-Open No. 9-126307 finally selects the gear that is set based on one of the drive state parameters. Therefore, the gear may not be selected in view of mutual effects of the plurality of parameters. For example, the second gear may not be selected in the case where it is appropriate to select the third gear when consideration is given only to a road surface gradient, to select the third gear when consideration is given to only an accelerator pedal position and to select the second gear when consideration is given to both the road surface gradient and the accelerator pedal position. Therefore, there is a room for further improvement for setting the gear, i.e., the gear ratio that is optimum in connection with the drive state, running environment and the like of the vehicle.

SUMMARY OF THE INVENTION

An object of the invention is to provide a gear shift system of a vehicle as well as a control method and a control device of an automatic transmission that can implement a more appropriate gear ratio.

A gear shift system for a vehicle according to an aspect comprises an automatic transmission; and a control unit. The control unit detects a vehicle speed, detects first information representing a driver's operation, detects second information representing running environment of the vehicle, sets a parameter having one of an accelerator pedal position and a throttle position as well as the vehicle speed and a drive force as components according to the detected vehicle speed, the first information and the second information, sets a gear ratio according to the parameter and a map determining the gear ratio based on one of the accelerator pedal position and the throttle position as well as the vehicle speed and the drive force, and having a gear shift line defined such that a rate of increase of the drive force with respect to the vehicle speed is zero or more, and controls the automatic transmission to shift the gear according to the set gear ratio.

This structure sets the parameter having one of the accelerator pedal position and the throttle position as well as the vehicle speed and the drive force as components according to the vehicle speed, the first information representing the driver's operation and the second information representing the running environment of the vehicle. Thereby, the predetermined parameter can be obtained in view of both the driver's operation and the running environment of the vehicle. The gear ratio is set according to the parameter and the map determining the gear ratio based on one of the accelerator pedal position and the throttle position as well as the vehicle speed and the drive force, and having the gear shift line defined such that the rate of increase of the drive force with respect to the vehicle speed is zero or more. The automatic transmission is controlled to shift the gear according to the gear ratio thus set. Thereby, the gear ratio can be set with consideration given to the mutual effects of the driver's operation and the running environment of the vehicle. Therefore, the gear ratio of can be set more appropriately with respect to the driver's operation and the running environment of the vehicle, as compared with the case where the gear ratio is set with consideration given to the driver's operation and the running environment of the vehicle independently of each other. Further, in the map, the gear shift line is defined such that the rate of increase of the drive force with respect to the vehicle speed is zero or more. Thereby, the locus of the parameter that is obtained when the drive force decreases with increase in vehicle speed while the accelerator pedal position is in a constant state can easily cross an up-shift line. This facilitates setting of the vehicle speed at which the up-shift is to be performed with the constant accelerator pedal position or the throttle position. Consequently, the gear ratio that is further appropriate with respect to the vehicle speed can be set. Also, the down-shift line hardly crosses the locus of the parameter that is obtained when the vehicle speed increases while the drive force is substantially constant. Therefore, when the vehicle speed is increasing with the drive force kept substantially constant, it is difficult to perform unnecessary down-shift. This facilitates maintaining of the gear ratio that is set appropriately with respect to the vehicle speed. Consequently, the more appropriate gear ratio can be implemented.

A gear shift system for a vehicle according to another aspect comprises an automatic transmission; and a control unit. The control unit detects a vehicle speed, detects first information representing a driver's operation, detects second information representing running environment of the vehicle, sets a parameter having one of an accelerator pedal position and a throttle position as well as the vehicle speed and a drive force as components according to the detected vehicle speed, the first information and the second information, sets a gear ratio according to the parameter and a map determining the gear ratio based on one of the accelerator pedal position and the throttle position as well as the vehicle speed and the drive force, and having a down-shift line defined such that the drive force differs based on one of the accelerator pedal position and the throttle position, and controls the automatic transmission to shift the gear according to the set gear ratio.

This structure sets the parameter having one of the accelerator pedal position and the throttle position as well as the vehicle speed and the drive force as components according to the vehicle speed, the first information representing the driver's operation and the second information representing the running environment of the vehicle. Thereby, the predetermined parameter can be obtained in view of both the driver's operation and the running environment of the vehicle. The gear ratio is set according to the parameter and the map determining the gear ratio based on one of the accelerator pedal position and the throttle position as well as the vehicle speed and the drive force, and having the down-shift line defined such that the drive force differs based on one of the accelerator pedal position and the throttle position. The automatic transmission is controlled to shift the gear according to the gear ratio thus set. Thereby, the gear ratio can be set with consideration given to the mutual effects of the driver's operation and the running environment of the vehicle. Therefore, the gear ratio of can be set more appropriately with respect to the driver's operation and the running environment of the vehicle, as compared with the case where the gear ratio is set with consideration given to the driver's operation and the running environment of the vehicle independently of each other. Further, in the map, the down-shift line is defined such that the drive force differs based on one of the accelerator pedal position and the throttle position. For example, the down-shift line is defined such that the drive force decreases with increase in one of the accelerator pedal position and the throttle position. Thereby, the down-shift can be performed owing to the increase in accelerator pedal position even when the amount of increase of the drive force is small with respect to the amount of increase of the accelerator pedal position or the throttle position. Therefore, the more appropriate gear ratio can be set with respect to the accelerator pedal position or the throttle position. Consequently, the more appropriate gear ratio can be implemented.

Preferably, the down-shift line is defined such that the drive force decreases with increase in one of the accelerator pedal position and the throttle position.

This structure can perform the down-shift owing to the increase in accelerator pedal position even when the amount of increase of the drive force is small with respect to the amount of increase of the accelerator pedal position or the throttle position. Therefore, the more appropriate gear ratio can be set with respect to the accelerator pedal position and the throttle position.

A gear shift system for a vehicle according to still another aspect comprises an automatic transmission; and a control unit. The control unit detects a vehicle speed, detects first information representing a driver's operation, detects second information representing running environment of the vehicle, sets a parameter having one of an accelerator pedal position and a throttle position as well as the vehicle speed and a drive force as components according to the detected vehicle speed, the first information and the second information, sets a gear ratio according to the parameter and a map determining the gear ratio based on one of the accelerator pedal position and the throttle position as well as the vehicle speed and the drive force, controls the automatic transmission to shift the gear according to the set gear ratio, allows the down-shift after the up-shift as well as the up-shift after the down-shift when at least one of a first condition that the amount of change of one of the accelerator pedal position and the throttle position after the last change of the gear ratio is larger than a threshold and a second condition that an amount of change of the drive force after the last change of the gear ratio is larger than the threshold is satisfied, and inhibits the down-shift after the up-shift as well as the up-shift after the down-shift when both the first and second conditions are not satisfied.

This structure sets the parameter having one of the accelerator pedal position and the throttle position as well as the vehicle speed and the drive force as components according to the vehicle speed, the first information representing the driver's operation and the second information representing the running environment of the vehicle. Thereby, the predetermined parameter can be obtained in view of both the driver's operation and the running environment of the vehicle. The gear ratio is set according to the parameter and the map determining the gear ratio based on one of the accelerator pedal position and the throttle position as well as the vehicle speed and the drive force. The automatic transmission is controlled to shift the gear according to the gear ratio thus set. Thereby, the gear ratio can be set with consideration given to the mutual effects of the driver's operation and the running environment of the vehicle. Therefore, the gear ratio of can be set more appropriately with respect to the driver's operation and the running environment of the vehicle, as compared with the case where the gear ratio is set with consideration given to the driver's operation and the running environment of the vehicle independently of each other. If an interval between the up-shift line and the down-shift line is small in the map determining the gear ratio, the up-shift and the down-shift may be repeated frequently. In view of this, the structure allows the down-shift after the up-shift as well as the up-shift after the down-shift when the first condition that the amount of change of one of the accelerator pedal position and the throttle position after the last change of the gear ratio is larger than a threshold or the second condition that the amount of change of the drive force after the last change of the gear ratio is larger than the threshold is satisfied. Also, the structure inhibits the down-shift after the up-shift as well as the up-shift after the down-shift when both the first and second conditions are not satisfied. Thereby, the number of times of unnecessary gear shift can be reduced. Therefore, the gear that is appropriately set can be easily maintained. Consequently, the appropriate gear ratio can be implemented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram (first) illustrating a manner of mediating parameters.

FIG. 4 shows a parameter α(OUT).

DESCRIPTION OF THE PREFERRED EMBODIMENTS

First Embodiment

Figure 1:
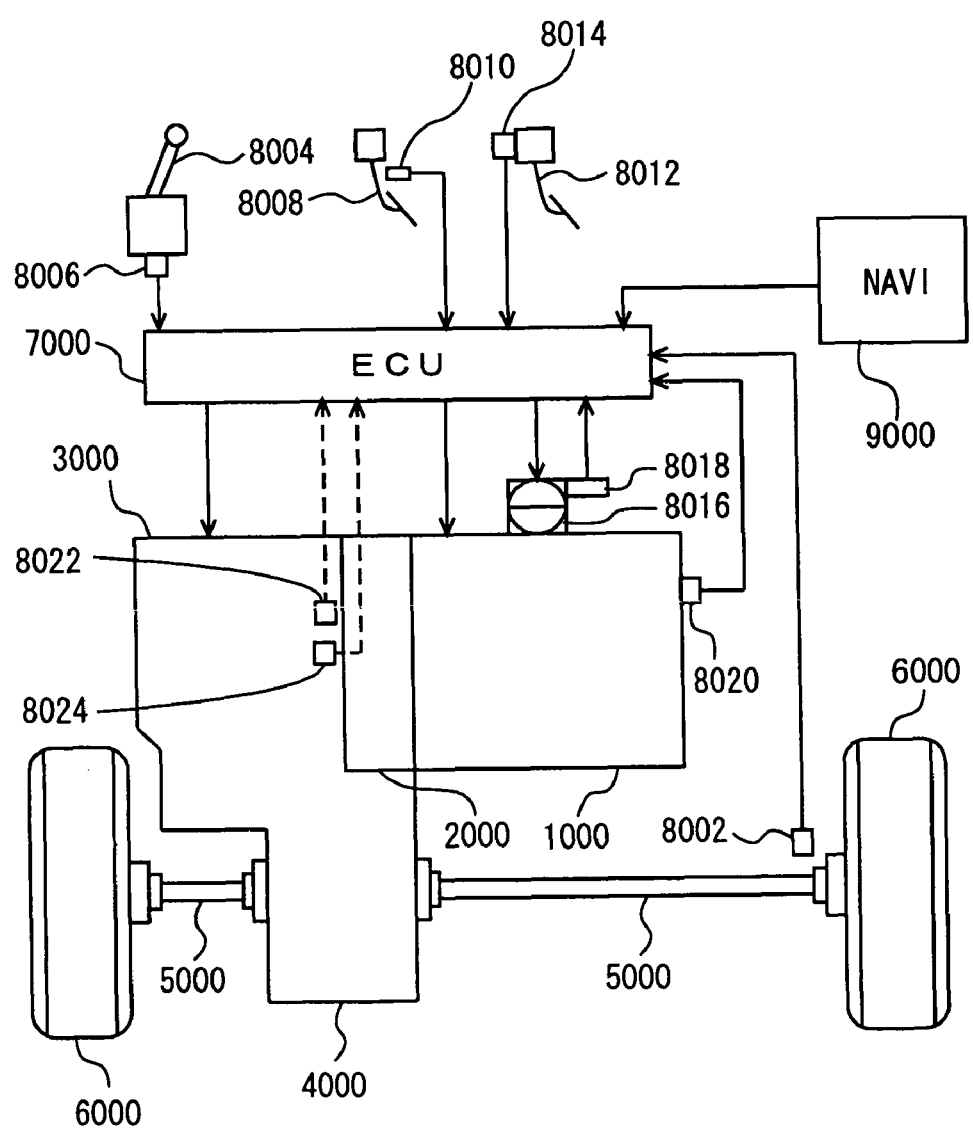
FIG. 1 is a schematic view showing a structure of a vehicle.

A vehicle equipped with a control device according to the first embodiment of the present invention will be described with reference to FIG. 1. The vehicle is an FF (Front engine Front drive) vehicle. It is noted that the vehicle may be a vehicle such as a FR (Front engine Rear drive) vehicle other than the FF vehicle.

The vehicle includes an engine 1000, a torque converter 2000, an automatic transmission 3000, a differential gear 4000, a drive shaft 5000, front wheels 6000 and an ECU (Electronic Control Unit) 7000.

Engine 1000 is an internal combustion engine that burns a mixture consisting of fuel injected from an injector (not shown) and air, inside a combustion chamber of a cylinder. A piston in the cylinder is pushed down by the combustion, whereby a crankshaft is rotated. An amount of fuel injected from the injector is determined in accordance with an amount of air taken into engine 100 such that a desired air-fuel ratio (for example, stoichiometric air-fuel ratio) is attained.

Automatic transmission 3000 is coupled to engine 1000 with torque converter 2000 being interposed. Therefore, an output shaft revolution speed of torque converter 2000 (a turbine speed NT) is equal to an input shaft revolution speed of automatic transmission 3000.

Automatic transmission 3000 is an automatic transmission having a planetary gear unit. Automatic transmission 3000 converts the revolution speed of the crankshaft to a desired revolution speed for speed change by implementing a desired gear. Instead of the automatic transmission implementing the gear, a CVT (Continuously Variable Transmission) that continuously varies a gear ratio may be mounted. Alternatively, an automatic transmission including constant mesh gears shifted by means of a hydraulic actuator may be mounted.

An output gear of automatic transmission 3000 meshes with differential gear 4000. Drive shaft 5000 is coupled to differential gear 4000 by spline-fitting or the like. A motive power is transmitted to left and right front wheels 6000 via drive shaft 5000.

Wheel speed sensors 8002, a position sensor 8006 of a shift lever 8004, an accelerator pedal position sensor 8010 of an accelerator pedal 8008, a stroke sensor 8014 of a brake pedal 8012, a throttle position sensor 8018 of an electronic throttle valve 8016, an engine speed sensor 8020, an input shaft speed sensor 8022 and an output shaft speed sensor 8024 are connected to ECU 7000 via a harness and the like. Further, a navigation system 9000 is connected to ECU 7000 via a harness and the like.

Wheel speed sensors 8002 detect the wheel speeds of the four wheels of the vehicle, respectively, and transmit signals representing the detected results to ECU 7000. ECU 7000 calculates a friction coefficient $\mu$ of a road surface according to a map using a speed difference between the wheels and others. The friction coefficient $\mu$ of the road surface can be calculated in a manner utilizing a well-known technology, and therefore description thereof is not repeated.

The position of shift lever 8004 is detected by position sensor 8006, and a signal representing the detected result is transmitted to ECU 7000. A gear of automatic transmission 3000 is automatically implemented corresponding to the position of shift lever 8004. Additionally, such a configuration may be employed that the driver can select a manual shift mode for arbitrarily selecting a gear according to the driver's operation.

Accelerator pedal position sensor 8010 detects the position (press-down degree) of accelerator pedal 8008 operated by the driver, and transmits a signal representing the detected result to ECU 7000. Stroke sensor 8014 detects the stroke amount of brake pedal 8012 operated by the driver, and transmits a signal representing the detected result to ECU 7000.

Throttle position sensor 8018 detects the position (degree of throttle opening) of electronic throttle valve 8016 of which position is adjusted by the actuator, and transmits a signal representing the detected result to ECU 7000. Electronic throttle valve 8016 regulates the amount of air (output of engine 1000) taken into engine 1000. The amount of air taken into engine 1000 increases with the degree of throttle opening. Thus, the throttle position or the degree of throttle opening can be used as a value representing the output of engine 1000. The amount of air may be regulated in accordance with a lift amount or an angle of action of an intake valve (not shown) provided in the cylinder. Here, the amount of air increases with the lift amount and/or the angle of action.

Engine speed sensor 8020 detects a speed (engine revolution speed NE) of the output shaft (crankshaft) of engine 1000, and transmits a signal representing the detected result to ECU 7000. Input shaft speed sensor 8022 detects an input shaft revolution speed NI (turbine speed NT) of automatic transmission 3000, and transmits a signal representing the detected result to ECU 7000.

Output shaft speed sensor 8024 detects an output shaft revolution speed NO of automatic transmission 3000, and transmits a signal representing the detected result to ECU 7000. ECU 7000 detects the vehicle speed based on output shaft revolution speed NO, a radius of the wheel and the like. The vehicle speed can be detected in a manner utilizing a well-known technology, and therefore description thereof is not repeated. Output shaft revolution speed NO may be used instead of the vehicle speed, as it is.

Navigation system 9000 detects the position of the vehicle by a GPS (Global Positioning System). Also, navigation system 9000 stores information representing a part of running environment of the vehicle such as gradients of road surfaces, curvatures of road surfaces, types of roads (freeways or general roads) and the like. To ECU 7000, navigation system 9000 transmits the information representing the surface gradient, surface curvature and type of the road on which the vehicle is currently running.

Navigation system 9000 receives VICS (Vehicle Information and Communication System) information representing a part of the current running environment of the vehicle. As the VICS information, navigation system 9000 receives a length (or degree) of traffic jam and others. Navigation system 9000 transfers the received VICS information to ECU 7000.

ECU 7000 controls equipment such that the vehicle is in a desired running state, based on signals sent from the foregoing sensors and the like as well as a map stored in an ROM (Read Only Memory), a program stored therein and the information transmitted from navigation system 9000. ECU 7000 may be formed of a plurality of divided ECUs.

In the present embodiment, when shift lever 8004 is in a D (drive) position and thereby a D (drive) range is selected as the shift range in automatic transmission 3000, ECU 7000 controls automatic transmission 3000 to implement one of the first to sixth gears. Since one of the first to sixth gears is implemented, automatic transmission 3000 can transmit a drive force to front wheels 6000. It is noted that the number of gears to be implemented is not limited to six, and may be seven or eight.

In this embodiment, a target value of the drive force of the vehicle is determined according to the accelerator pedal position, the stroke amount of the brake pedal and the running environment of the vehicle. For determining the target value of the drive force of the vehicle, consideration is also given to the drive force required by VSC (Vehicle Stability Control) for stabilizing behaviors of the vehicle, TRC (TRaction Control) for suppressing skids of the wheels, cruise control for keeping a set vehicle speed and the like. The throttle position and the like are determined to implement the target value of the determined drive force.

Figure 2:
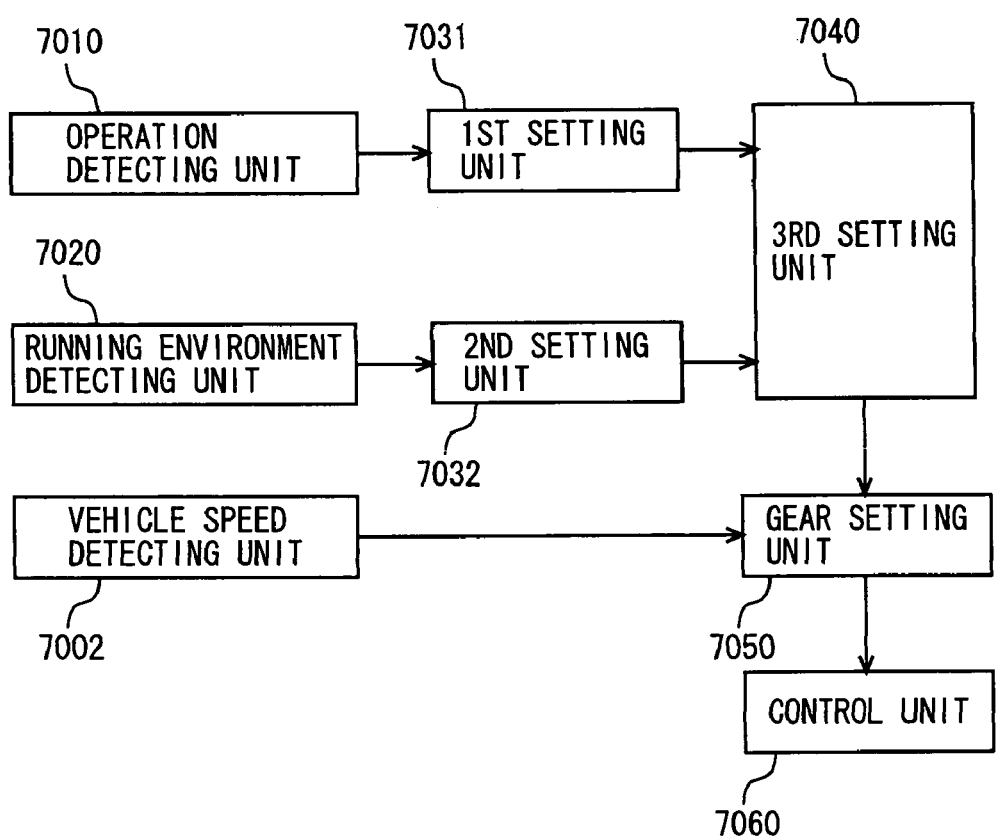
FIG. 2 is a functional block diagram of an ECU in a first embodiment of the invention.

Referring to FIG. 2, the function of ECU 7000 will be described below. The following function of ECU 7000 may be implemented by either hardware or software.

ECU 7000 includes a vehicle speed detecting unit 7002, an operation detecting unit 7010, a running environment detecting unit 7020, a first setting unit 7031, a second setting unit 7032, a third setting unit 7040, a gear setting unit 7050 and a control unit 7060.

Vehicle speed detecting unit 7002 detects the vehicle speed based on output shaft revolution speed NO of automatic transmission 3000 detected by output shaft speed sensor 8024.

Operation detecting unit 7010 detects information representing the operation of the driver. More specifically, it detects the accelerator pedal position based on the signal provided from accelerator pedal position sensor 8010. Also, operation detecting unit 7010 detects the stroke amount of brake pedal 8012 based on the signal transmitted from stroke sensor 8014. The information representing the driver's operation is not restricted to the above.

Running environment detecting unit 7020 detects the information representing the running environment of the vehicle. More specifically, running environment detecting unit 7020 detects the road surface gradient, the road surface curvature, the road type and the length (degree) of traffic jam based on the signals transmitted from navigation system 9000. Further, running environment detecting unit 7020 calculates friction coefficient μ of the road surface based on the signal transmitted from wheel speed sensors 8002. The information representing the running environment of the vehicle is not restricted to the above.

First setting unit 7031 sets a parameter that has the accelerator pedal position and the drive force as components, according to the information representing the driver's operation. More specifically, first setting unit 7031 detects the drive force (target drive force) of the vehicle from the accelerator pedal position according to the map that is prepared in advance. The accelerator pedal position thus detected is used as it is. Thereby, the parameter (vector) according to the detected accelerator pedal position is set as represented by alternate long and short dash line in FIG. 3.

Also, the parameter that has the accelerator pedal position and the drive force according to the stroke amount of brake pedal 8012 as the components is set according to the predetermined map as represented by alternate long and two short dashes line. It is noted that the detected accelerator pedal position may be used as it is.

First setting unit 7031 provides a parameter α(1) obtained by mediating the two parameters obtained from the accelerator pedal position and the stroke amount. For example, it outputs a parameter prepared by collecting the maximum values of respective components of the two parameters as represented by solid line in FIG. 3. The manner of mediating the parameters is not restricted to the above.

Second setting unit 7032 sets the parameter that has the accelerator pedal position and the drive force as components, according to the information representing the environment in which the vehicle runs. More specifically, second setting unit 7032 sets the parameter (vector) that has the accelerator pedal position and the drive force corresponding to each of the road surface gradient, the road surface curvature, the road type, the length of traffic jam and friction coefficient μ of the road surface, according to the map that is prepared in advance. Second setting unit 7032 outputs a parameter α(2) obtained by mediating these parameters. For example, it outputs the parameter obtained by collecting the maximum values of the respective components of the plurality of obtained parameters.

The detected accelerator pedal position may be used as it is. Also, consideration may be given to the drive force that is set by the VSC, TRC, cruise control and the like.

Third setting unit 7040 sets one parameter α(OUT) obtaining by mediating parameters α(1) and α(2) provided from first and second setting units 7031 and 7032, respectively. For example, as shown in FIG. 4, third setting unit 7040 sets parameter α(OUT) by collecting the maximum values of the respective components of parameters α(1) and α(2). The manner of mediating the parameters is not restricted to the above.

Each parameter thus set includes the accelerator pedal position and the drive force as well as the vehicle speed as the components. Each parameter includes the vehicle speed detected by vehicle speed detecting unit 7002 as the component, as it is.

Figure 5:
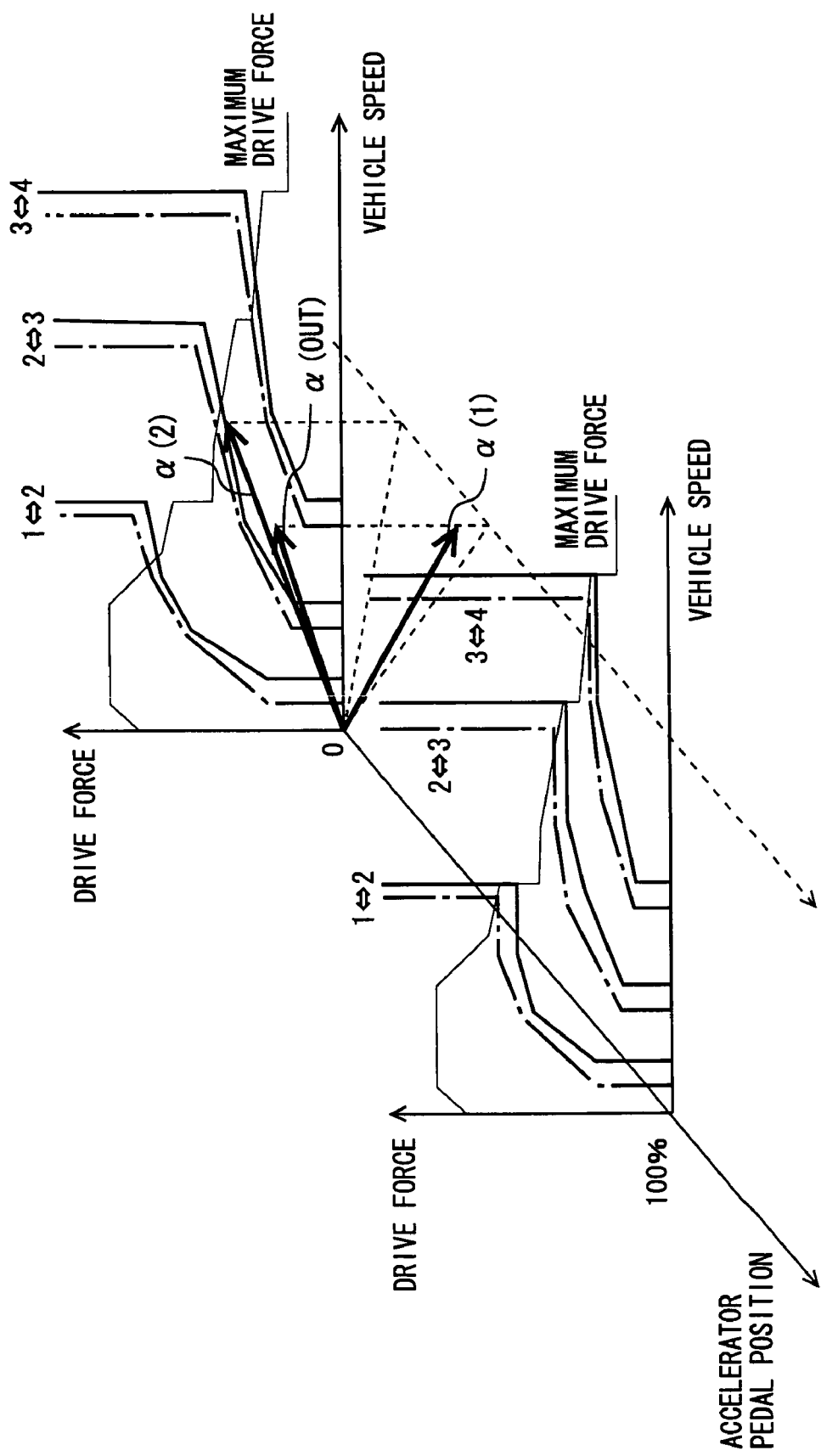
FIG. 5 is a diagram (first) showing a shift map.

Gear setting unit 7050 sets the gear, i.e., the gear ratio corresponding to parameter α(OUT) set by third setting unit 7040. As shown in FIG. 5, the gear is set according to a shift map using the accelerator pedal position, the drive force and the vehicle speed. A gear shift line represented by a solid line in FIG. 5 is an up-shift line. A gear shift line represented by an alternate long and short dash line in FIG. 5 is a down-shift line.

The manner of setting the gear by using the gear shift lines (up- and down-shift lines) in the shift map can be implemented by utilizing a well-known technology, and therefore description thereof is not repeated.

The shift map is determined for each type of vehicle. Therefore, the gear shift characteristics can be changed by changing only the shift map. The gear shift line defined in the shift map continuously changes according to changes in accelerator pedal position. The gear shift lines may be set at intervals that are predetermined in the direction of change of the accelerator pedal position, and a gear shift line at an accelerator pedal position between these lines may be obtained by linear interpolation.

Figure 6:
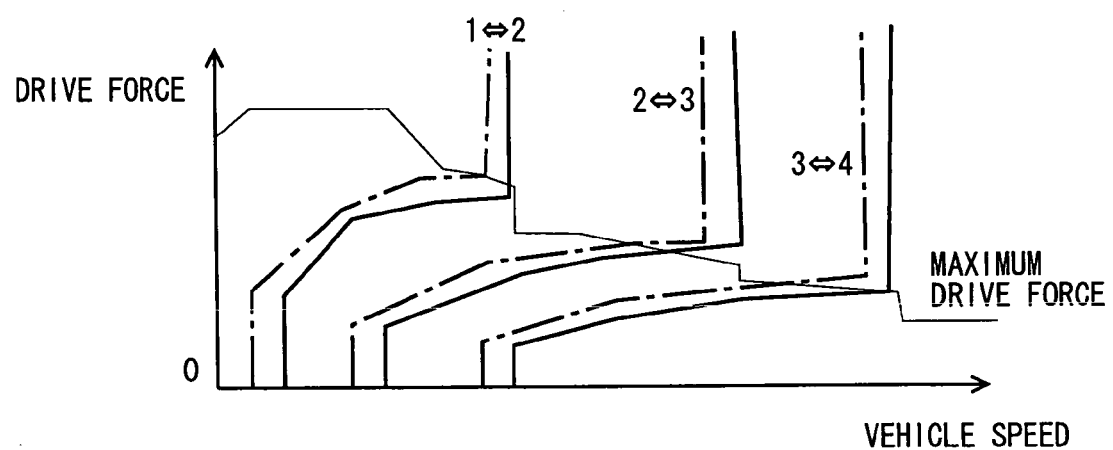
FIG. 6 is a diagram (first) showing gear shift lines in a shift map in the first embodiment of the invention.

In the shift map, as shown in FIG. 6, the gear shift lines are defined such that an increasing rate of the drive force with respect to the vehicle speed is zero or more. Thus, the gear shift lines are defined such that the drive force increases with the vehicle speed. In other words, the gear shift lines are defined to extend toward the upper right.

Control unit 7060 controls automatic transmission 3000 to shift the gear according to the set gear. More specifically, automatic transmission 3000 is controlled to implement the gear that is set by gear setting unit 7050.

Figure 7:
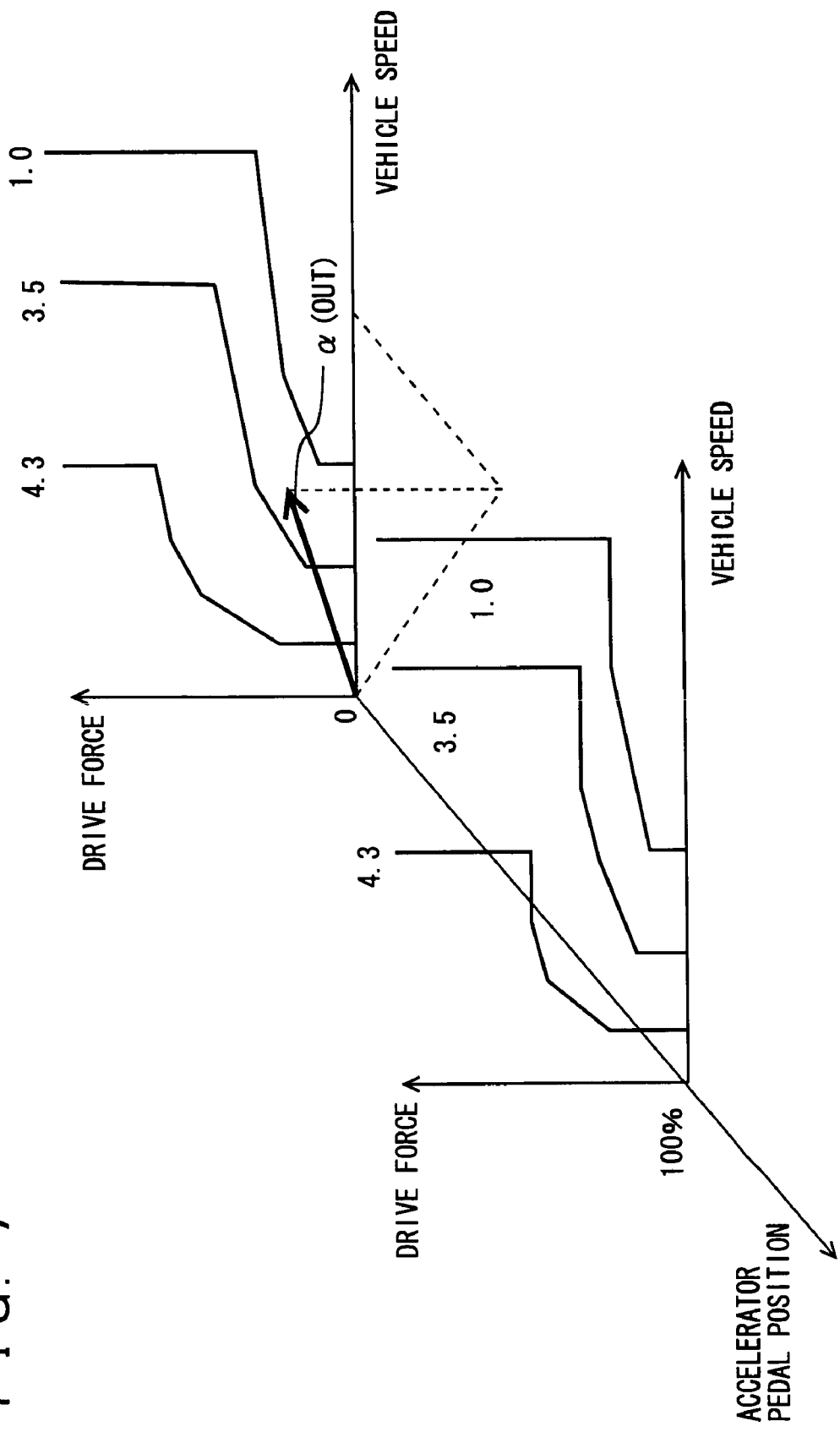
FIG. 7 is a diagram (second) showing the shift map.

When automatic transmission 3000 is a CVT, the gear ratio may be set by the gear shift line as shown in FIG. 7 instead of setting the gear by the gear shift line.

Figure 8:
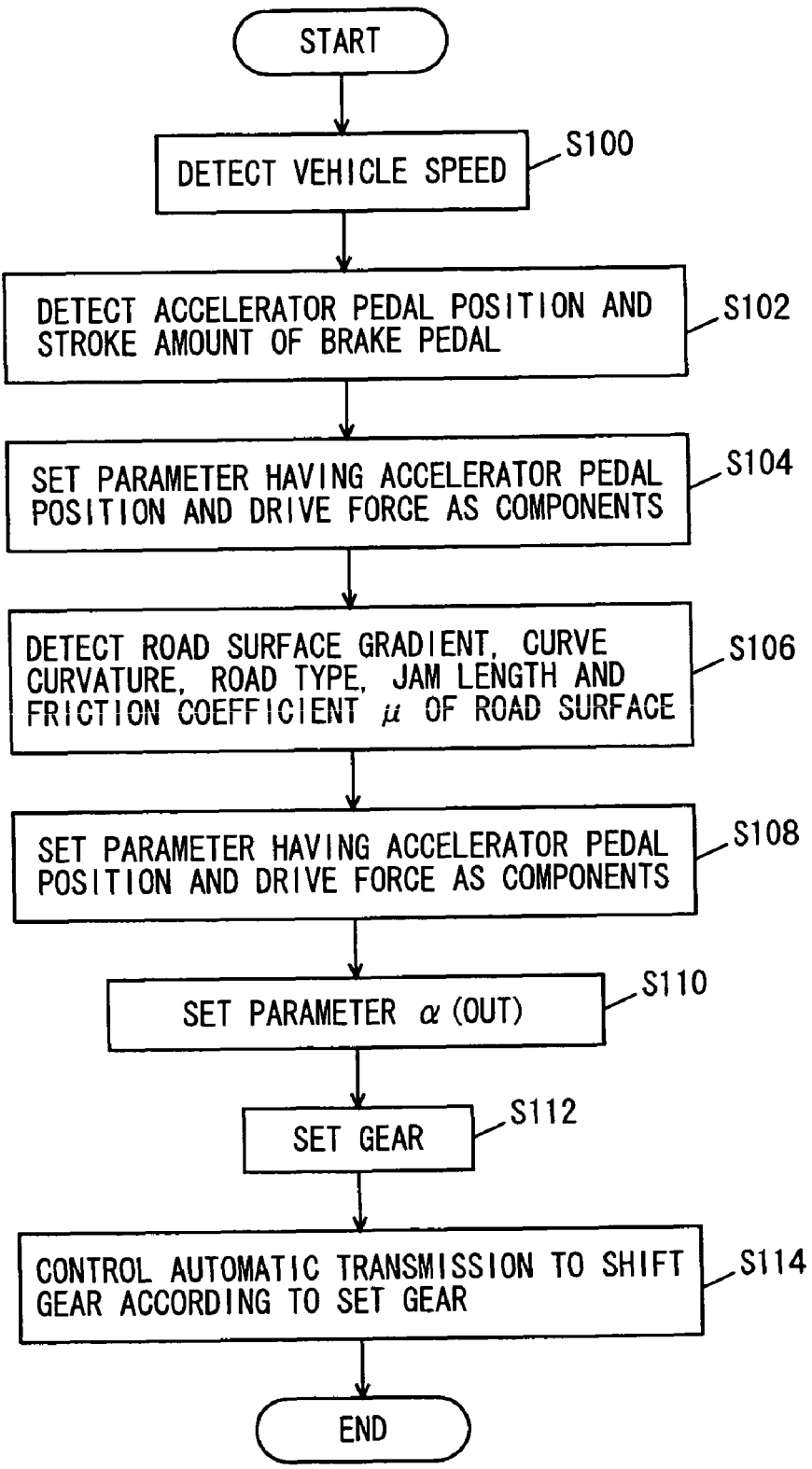
FIG. 8 is a flowchart showing a control structure of a program executed by the ECU in the first embodiment of the invention.

Referring to FIG. 8, description will now be given on the control structure of the program executed by ECU 7000 that is the control device according to the embodiment. Execution of the program described below is repeated at predetermined cycles. The program to be executed by ECU 7000 may be stored on CDs (Compact Discs), DVDs (Digital Versatile Discs) and the like for distribution on the market.

In step (which will be abbreviated as "S" hereinafter) 100, ECU 7000 detects the vehicle speed based on output shaft revolution speed NO of automatic transmission 3000 that is detected by output shaft speed sensor 8024.

In S102, ECU 7000 detects the information representing the driver's operation. Thus, it detects the accelerator pedal position based on the signal transmitted from accelerator pedal position sensor 8010. Further, it detects the stroke amount of brake pedal 8012 based on the signal transmitted from stroke sensor 8014. In S104, ECU 7000 sets the parameter having the accelerator pedal position and the drive force according to the information representing the driver's operation.

In S106, ECU 7000 detects the information representing the running environment of the vehicle. More specifically, it detects the road surface gradient, the road surface curvature, the road type and the length (degree) of traffic jam based on the signals transmitted from navigation system 9000. Also, ECU 7000 detects friction coefficient μ of the road surface based on the signal transmitted from wheel speed sensor 8002. In S108, ECU 7000 sets the parameter having the accelerator pedal position and the drive force as components according to the information representing the running environment of the vehicle.

In S110, ECU 7000 sets one parameter α(OUT) by mediating parameter α(1) obtained from the information representing the driver's operation and parameter α(2) obtained from the information representing the running environment of the vehicle.

In S112, ECU 7000 sets the gear according to parameter α(OUT) thus set according to the shift map. In S114, ECU 7000 controls automatic transmission 3000 to shift the gear according to the gear thus set.

Description will now be given on the operation of ECU 7000 based on the foregoing structure and the flowchart.

During the running of the vehicle, the vehicle speed is detected (S100). Further, the information representing the driver's operation, i.e., the accelerator pedal position and the stroke amount of brake pedal 8012 are detected (S102). According to the information representing the driver's operation, the parameter having the accelerator pedal position and the drive force as components is set (S104).

In addition to the information representing the driver's operation, the information representing the running environment of the vehicle, i.e., the road surface gradient, the road surface curvature, friction coefficient μ of the road surface, the road type, the length (degree) of traffic jam are detected (S106). Similarly to the information representing the driver's operation, the parameter having the accelerator pedal position and the drive force as components is set according to the information representing the running environment of the vehicle (S108). Thereby, the driver's operation and the running environment of the vehicle can be represented with unified parameters having the same kinds of components.

One parameter α(OUT) is set by mediating parameter α(1) obtained from the information representing the driver's operation and parameter α(2) obtained from the information representing the running environment of the vehicle (S110). Thereby, parameter α(OUT) that is determined in view of both the driver's operation and the running environment of the vehicle.

The gear corresponding to parameter α(OUT) is set according to the shift map (S112). Automatic transmission 3000 is controlled to shift the gear according to the gear thus set (S114). Thereby, the gear can be set in view of the mutual effects of both the driver's operation and the running environment of the vehicle. Therefore, the gear can be set appropriately for the driver's operation and the running environment of the vehicle, as compared with the case where the gear ratio is set with consideration given to the driver's operation and the running environment of the vehicle independently of each other.

In the shift map, the gear shift lines are defined such that an increase rate of the drive force with respect to the vehicle speed is zero or more. The reason for this is as follows.

Figure 9:
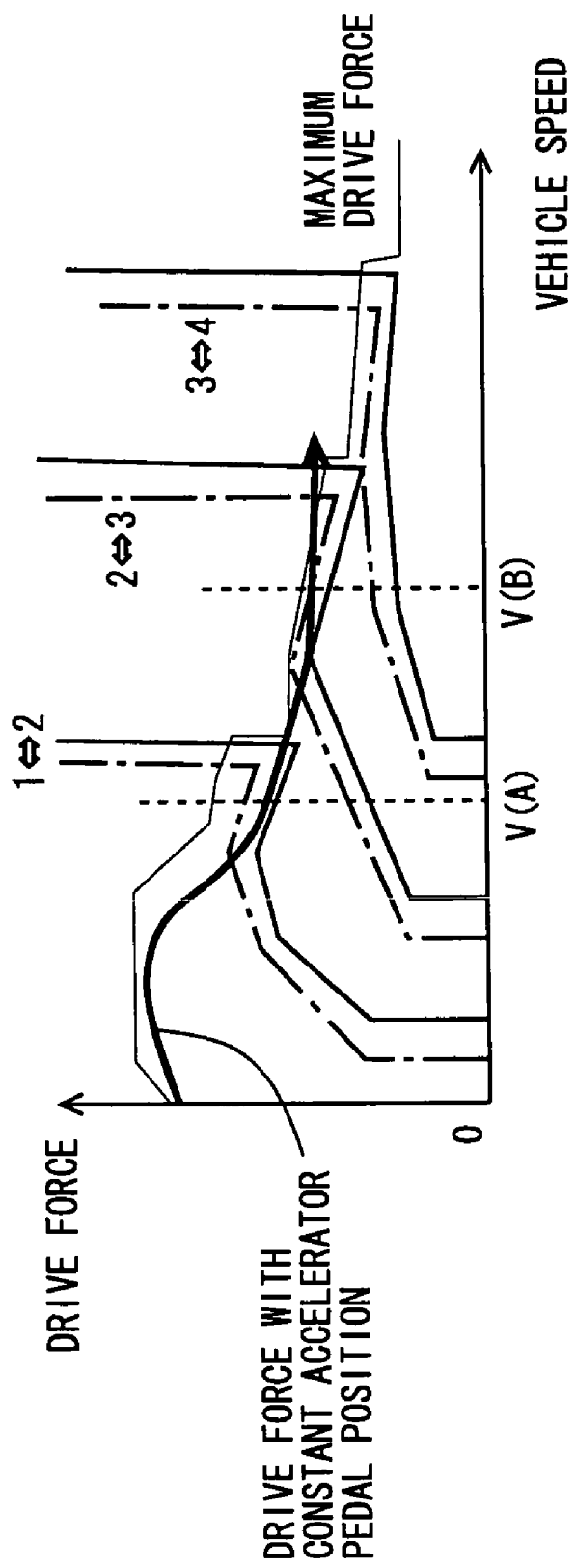
FIG. 9 shows gear shift lines having portions in which a drive force lowers with increase in vehicle speed.

When the accelerator pedal position is constant, the drive force decreases with increase in vehicle speed, and then becomes substantially constant as shown in FIG. 9. Therefore, as shown in FIG. 9, in the case where the up-shift line is defined to lower the drive force with increase in vehicle speed near V(A), a locus of the parameter (drive force) obtained when the accelerator pedal position is constant hardly crosses the up-shift line. Therefore, it is difficult to set the vehicle speed at which the up-shift is performed when the accelerator pedal position is constant.

In the case where a down-shift line is defined to lower the drive force with increase in vehicle speed near V(B), the locus of the parameter may cross the down-shift line when the vehicle speed increases while the drive force is substantially constant. Thus, unnecessary down-shift may be performed as the vehicle speed increases, in spite of the fact that the increase in drive force is not required.

Accordingly, for facilitating setting of the vehicle speed at which the up-shift is performed and reducing the number of times of unnecessary down-shift, the gear shift line is set such that the increase rate of the drive force with respect to the vehicle speed may be zero or more in the shift map.

Figure 10:
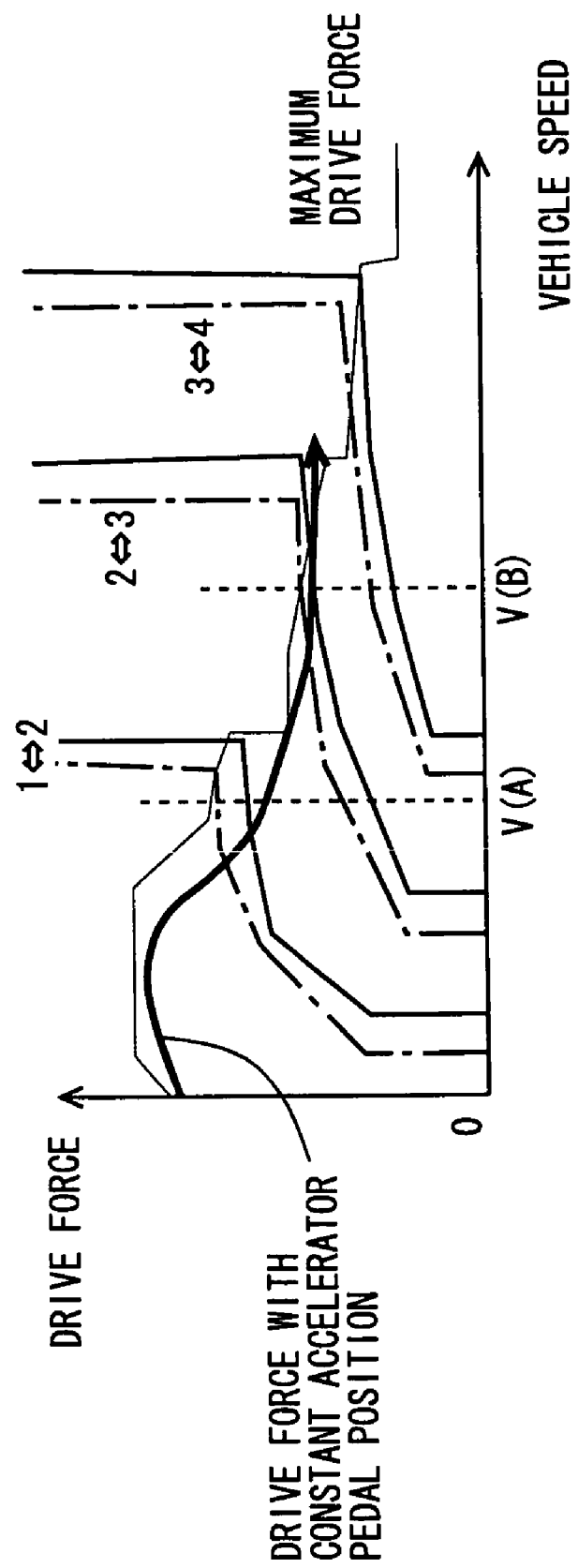
FIG. 10 is a diagram (second) showing the gear shift lines in the shift map in the first embodiment of the invention.

Thereby, as shown in FIG. 10, the locus of the parameter obtained with the accelerator pedal position kept in a constant state can easily cross the up-shift line. Therefore, it becomes easy to set the vehicle speed at which the up-shift is to be performed with the accelerator pedal position kept in a constant state. Consequently, the gear ratio can be set finely.

Further, as shown in FIG. 10, a locus of the parameter obtained when the vehicle speed increases with the drive force kept substantially constant hardly crosses the down-shift line. Therefore, when the vehicle speed is increasing with the drive force kept substantially constant, it is difficult to perform unnecessary down-shift.

In the control device according to the embodiment, as described above, the parameter α(OUT) having the vehicle speed, the accelerator pedal position and the drive force as the components is set according to the vehicle speed, the information representing the driver's operation and the running environment of the vehicle. Thereby, parameter α(OUT) determined in view of both the driver's operation and the running environment of the vehicle can be obtained. The gear according to this parameter α(OUT) is set according to the shift map. The automatic transmission is controlled to shift the gear according to the set gear. Thereby, the gear can be set in view of the mutual effects of the driver's operation and the running environment of the vehicle. Therefore, the gears of the automatic transmission can be set appropriately for the driver's operation and the running environment of the vehicle, as compared with the case where the gear ratio is set with consideration given to the driver's operation and the running environment of the vehicle independently of each other. In the shift map, the gear shift line is defined such that the increase rate of the drive force with respect to the vehicle speed may be zero or more. Thereby, the locus of the parameter obtained when the drive force lowers according to increase in vehicle speed while the accelerator pedal position is constant can easily cross the up-shift line. This facilitates setting of the vehicle speed at which the up-shift is to be performed with the constant accelerator pedal position. Consequently, the gear ratio that is further appropriate with respect to the vehicle speed can be set. Further, the locus of the parameter obtained when the vehicle speed increases with a substantially constant drive force hardly crosses the down-shift line. Therefore, when the vehicle speed is increasing while the drive force is constant, it is difficult to perform unnecessary down-shift. Thus, the gear ratio that is set appropriately with respect to the vehicle speed can be maintained easily. Consequently, the further appropriate gear ratio can be implemented.

The parameter having the components other than the vehicle speed, the accelerator pedal position and the drive force may be set in addition to them.

Figure 11:
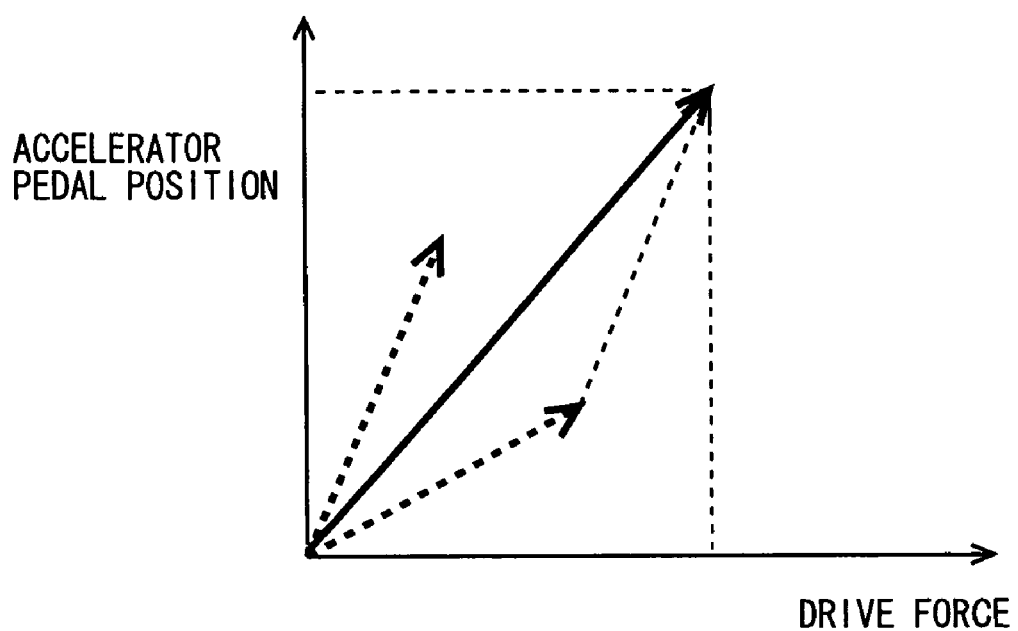
FIG. 11 is a diagram (second) showing the manner of mediating the parameters.
Figure 12:
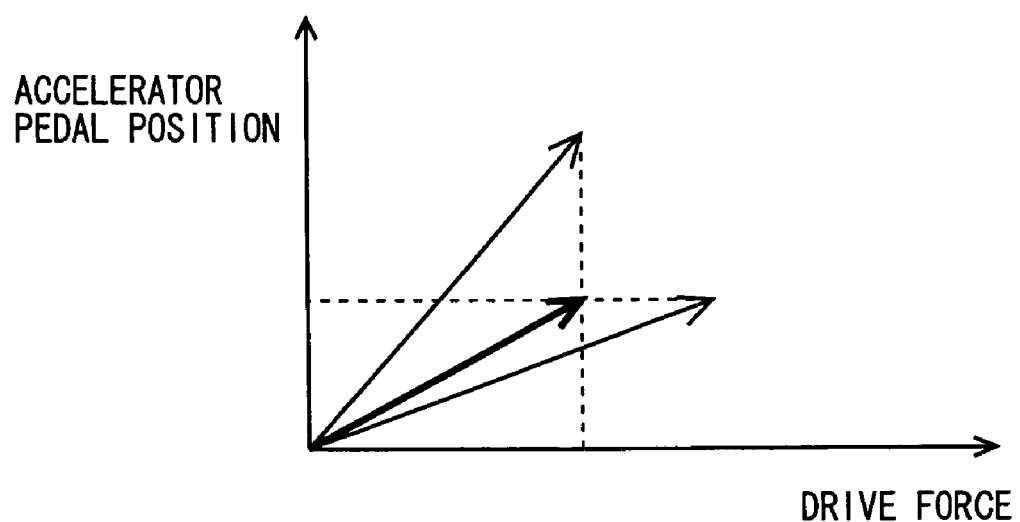
FIG. 12 is a diagram (third) showing the manner of mediating the parameters.

Instead of the manner of mediating the plurality of parameters by collecting the maximum values of the respective components of the parameters, the parameters may be mediated by adding each type of components of the plurality of parameters independently of the other types, as represented by solid line in FIG. 11. Thus, the parameters may be mediated by adding the vectors. Further, as shown in FIG. 12, the mediation of the parameters may be performed by collecting the minimum values of the respective components of the plurality of parameters. Further, the parameters may be represented as coordinates.

Further, the throttle position may be used instead of the accelerator pedal position because the accelerator pedal position is substantially proportional to the throttle position.

Second Embodiment

A second embodiment of the invention will now be described. This embodiment differs from the foregoing first embodiment in that the down-shift line is defined to decrease the drive force with increase in accelerator pedal position. Structures other than the above as well as the functions thereof are the same as those of the foregoing first embodiment. Therefore, description thereof is not repeated.

Figure 13:
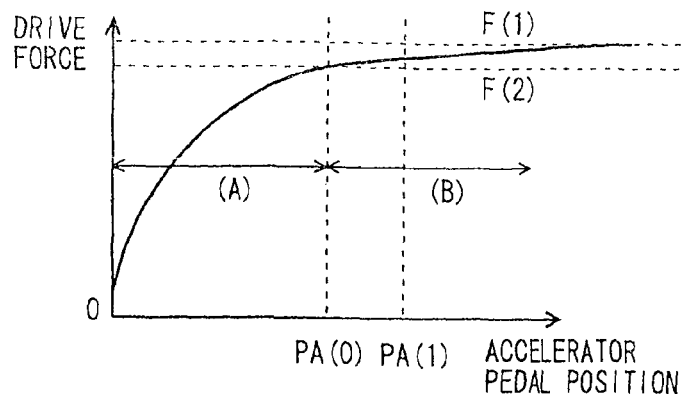
FIG. 13 shows a relationship between an accelerator pedal position and the drive force.
Figure 14:
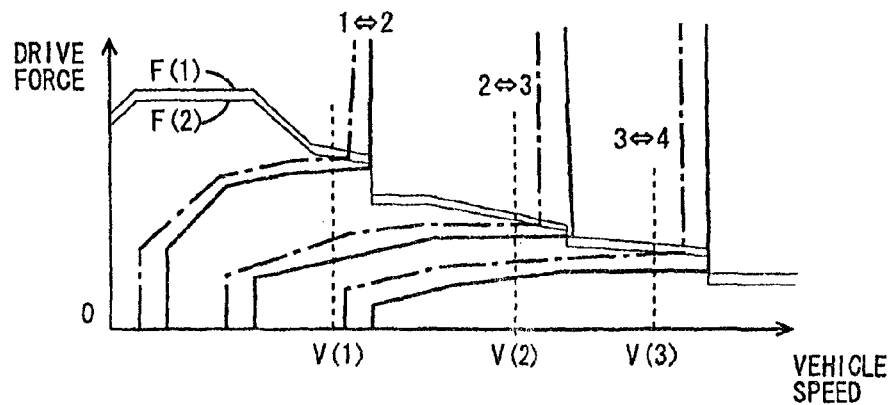
FIG. 14 is a diagram (first) showing gear shift lines in a shift map in a second embodiment of the invention.

As shown in FIG. 13, the rate of change of the vehicle's drive force decreases with the accelerator pedal position increases. When the accelerator pedal position is in a region (A) where the accelerator pedal position is equal to or lower than PA(0), the rate of change of the vehicle's drive force with respect to the accelerator pedal position is equal to or higher than the threshold. In a region (B) where the accelerator pedal position is larger than PA(0), the rate of change of the vehicle's drive force with respect to the accelerator pedal position is smaller than the threshold. In FIG. 13, F(1) indicates a maximum value of the vehicle's drive force. F(2) indicates a minimum value of the vehicle's drive force in the region (B) where the increase rate of the vehicle's drive force with respect to the accelerator pedal position is smaller than the threshold.

In the region (A) where the rate of change of the vehicle's drive force with respect to the accelerator pedal position is equal to or higher than the threshold, the amount of change of the vehicle's drive force with respect to the amount of change of the accelerator pedal position is sufficiently large. Therefore, the gear can be easily set according to the shift map using the drive force.

Conversely, in the region (B) where the increase rate of the vehicle's drive force with respect to the accelerator pedal position is smaller than the threshold, the amount of change of the vehicle's drive force with respect to the amount of change of the accelerator pedal position is small. Therefore, it is difficult to set the gear according to the shift map using the drive force.

In this embodiment, therefore, the down-shift line is defined to lower the drive force with increase in accelerator pedal position. The down-shift line will now be described. For the sake of simplicity, the following description will be given on the case where the vehicle speed is V(1), V(2) or (V3) (V(1)<V(2)<V(3)).

In the region (B) where the increase rate of the vehicle's drive force with respect to the accelerator pedal position is smaller than the threshold, and particularly in a region where the accelerator pedal position is PA(1) (PA(1)>PA(0)), the drive force that defines the down-shift line when the vehicle speed is V(1), V(2) or V(3) is smaller than maximum value F(1) of the vehicle's drive force.

Figure 15:
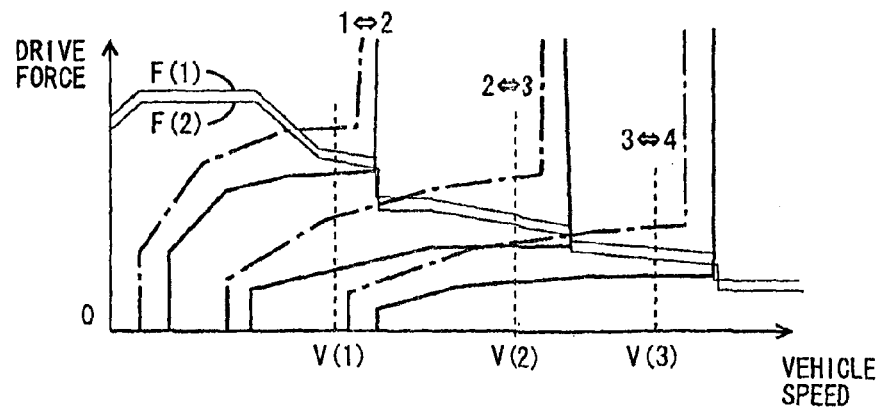
FIG. 15 is a diagram (second) showing the gear shift lines in the shift map in the second embodiment of the invention.

As shown in FIG. 15, in the region where the accelerator pedal position is equal to or lower than PA(1), the drive force that defines the down-shift line when the vehicle speed is V(1), V(2) or V(3) is larger than the maximum value F(1) of the vehicle's drive force.

Thereby, when the vehicle speed is V(1), V(2) or V(3), the down-shift can be performed by increasing the accelerator pedal position above PA(1). Therefore, even when the rate of change of the drive force with respect to the accelerator pedal position is small, the accelerator pedal position that implements the down-shift can be easily set. Consequently, the gear can be set appropriately with respect to the accelerator pedal position.

Third Embodiment

A third embodiment of the invention will now be described. This embodiment differs from the foregoing first embodiment in that the third embodiment inhibits the down-shift after the up-shift as well as the up-shift after the down-shift when both the condition that the amount of change of the accelerator pedal position after the last gear shift (i.e., after the determination that the gear shift is to be performed) is larger than a threshold and the condition that the amount of change of the drive force after the last gear shift is larger than a threshold are not satisfied. Structures other than the above as well as the functions thereof are the same as those of the foregoing first and second embodiments. Therefore, description thereof is not repeated.

Figure 16:
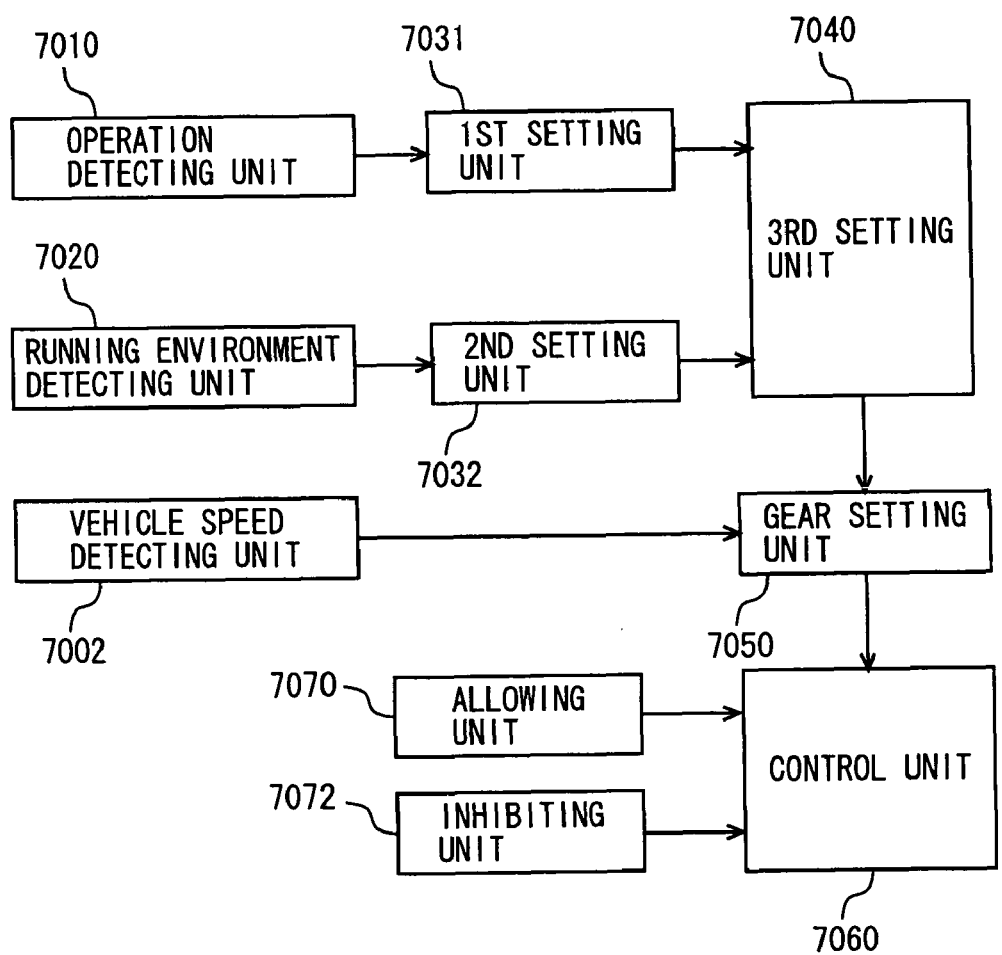
FIG. 16 is a functional block diagram of an ECU in a third embodiment of the invention.

Referring to FIG. 16, the functions of ECU 7000 will be described below. The same functions as those in the first embodiment bear the same numbers. Accordingly, description thereof is not repeated.

ECU 7000 further includes an allowing unit 7070 and an inhibiting unit 7072. Allowing unit 7070 allows the down-shift after the up-shift as well as the up-shift after the down-shift when the condition that the amount of change of the accelerator pedal position after the last gear shift (i.e., after the determination that the gear shift is to be performed) or the condition that the amount of change of the drive force after the last gear shift is larger than the threshold is satisfied.

Inhibiting unit 7072 inhibits the down-shift after the up-shift as well as the up-shift after the down-shift when neither of the condition that the amount of change of the accelerator pedal position after the last gear shift is larger than the threshold and the condition that the amount of change of the drive force after the last gear shift is larger than the threshold is satisfied.

In this embodiment, an absolute value of the difference between the accelerator pedal position at the time of the last gear shift (i.e., at the time of the determination that the change of the gear is to be performed) and the present accelerator pedal position is detected as the amount of change of the accelerator pedal position after the last gear shift. Likewise, an absolute value of the difference between the drive force at the time of the last gear shift and the present drive force is detected as the amount of change of the drive force.

Figure 17:
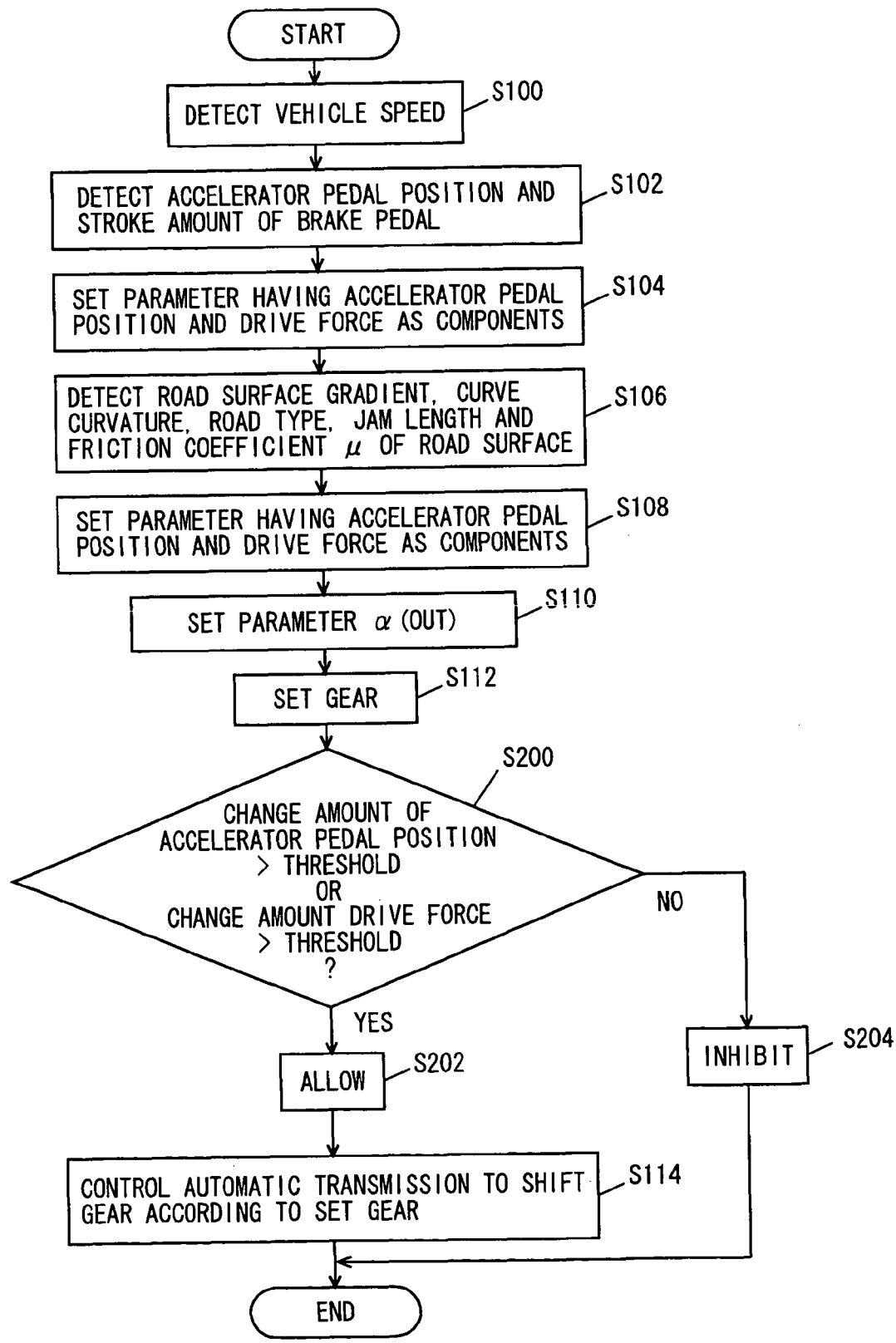
FIG. 17 is a flowchart showing a control structure of a program executed by the ECU in the third embodiment of the invention.

Referring to FIG. 17, description will now be given on the control structure of the program executed by ECU 7000, i.e., the control device according to this embodiment. Execution of the program described below is repeated at predetermined cycles. The same processing as that of the first embodiment already described bears the same step number. Therefore, description thereof is not repeated.

In S200, ECU 7000 determines whether the condition that the amount of change of the accelerator pedal position after the last gear shift is larger than the threshold or the condition that the amount of change of the drive force after the last gear shift is larger than the threshold is satisfied or not.

When the condition that the amount of change of the accelerator pedal position after the last gear shift is larger than the threshold or the condition that the amount of change of the drive force after the last gear shift is larger than the threshold is satisfied (YES in S200), the process proceeds to S202. Otherwise (NO in S200), the process proceeds to S204.

In S202, ECU 7000 allows the down-shift after the up-shift or the up-shift after the down-shift. In S204, ECU 7000 inhibits the down-shift after the up-shift and the up-shift after the down-shift (S204).

Based on the structures and flowcharts described above, ECU 7000 operates as follows.

Figure 18:
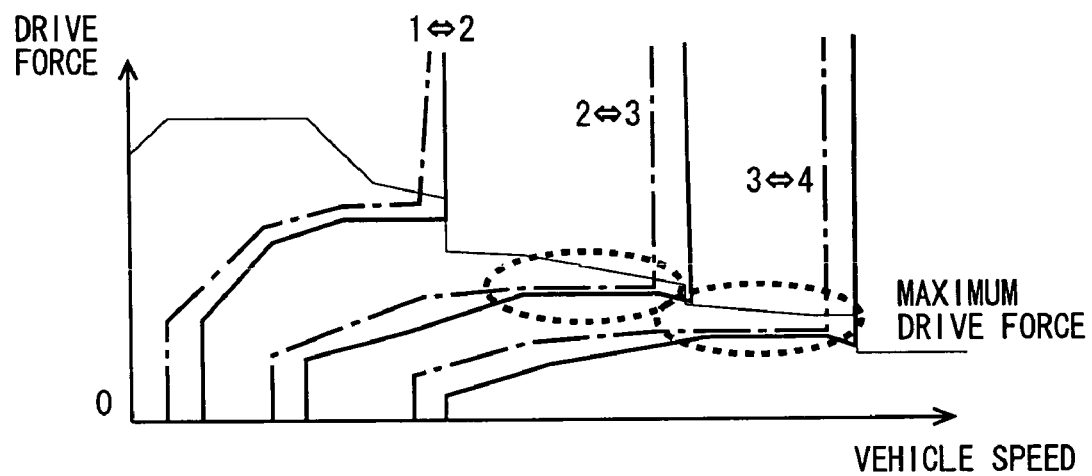
FIG. 18 is a diagram showing gear shift lines in a shift map in the third embodiment of the invention.
Figure 19:
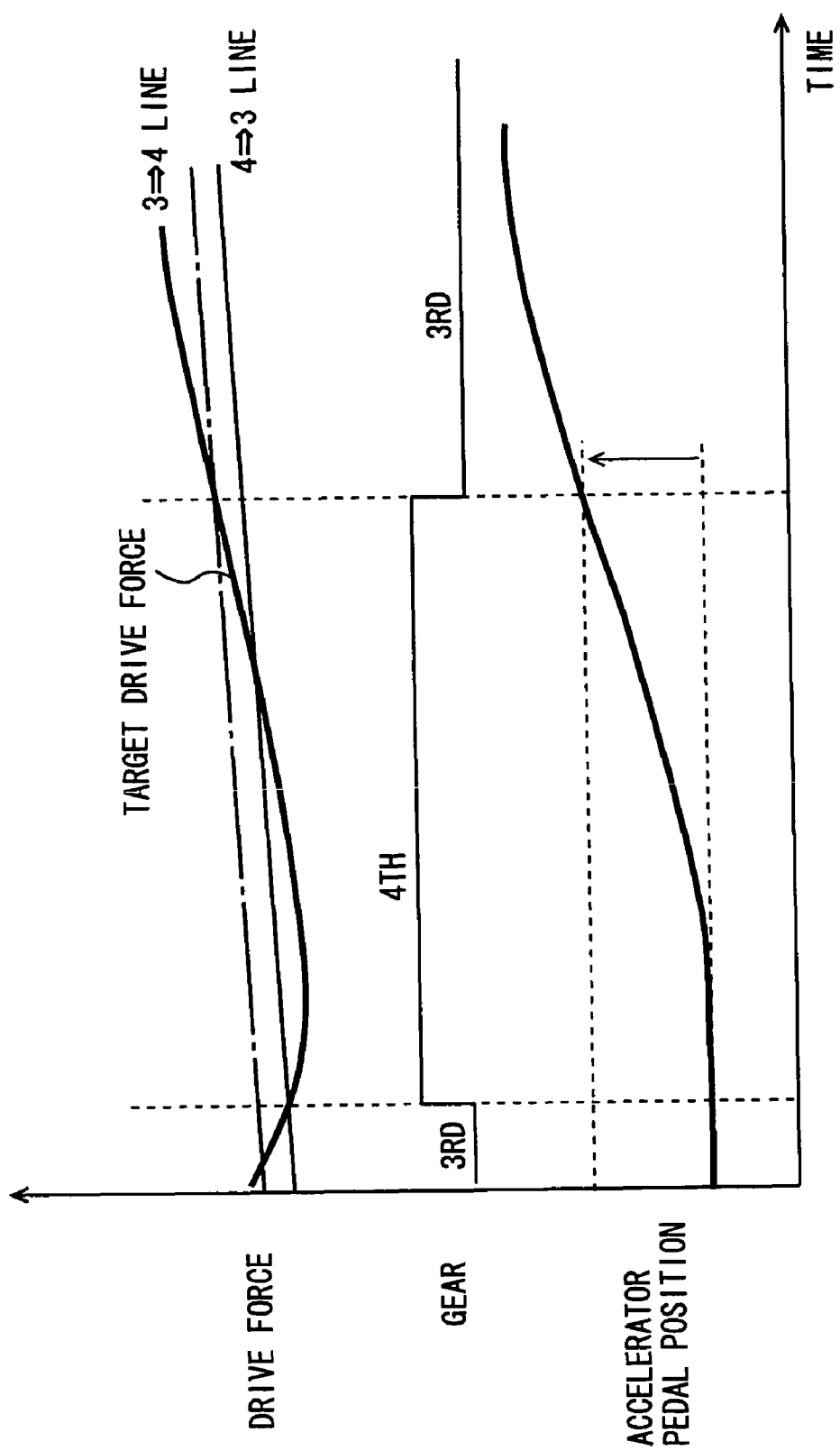
FIG. 19 is a timing chart showing changes of the drive force, the gear and the accelerator pedal position.

As illustrated in portions surrounded by broken line in FIG. 18, the shift map may have portions in which a distance between the up- and down-shift lines, i.e., a hysteresis is small. In the state where the accelerator pedal position is larger, i.e., the rate of change of the drive force with respect to the accelerator pedal position is small, it is difficult to perform the up-shift and the down-shift even when the hysteresis is small.

Figure 20:
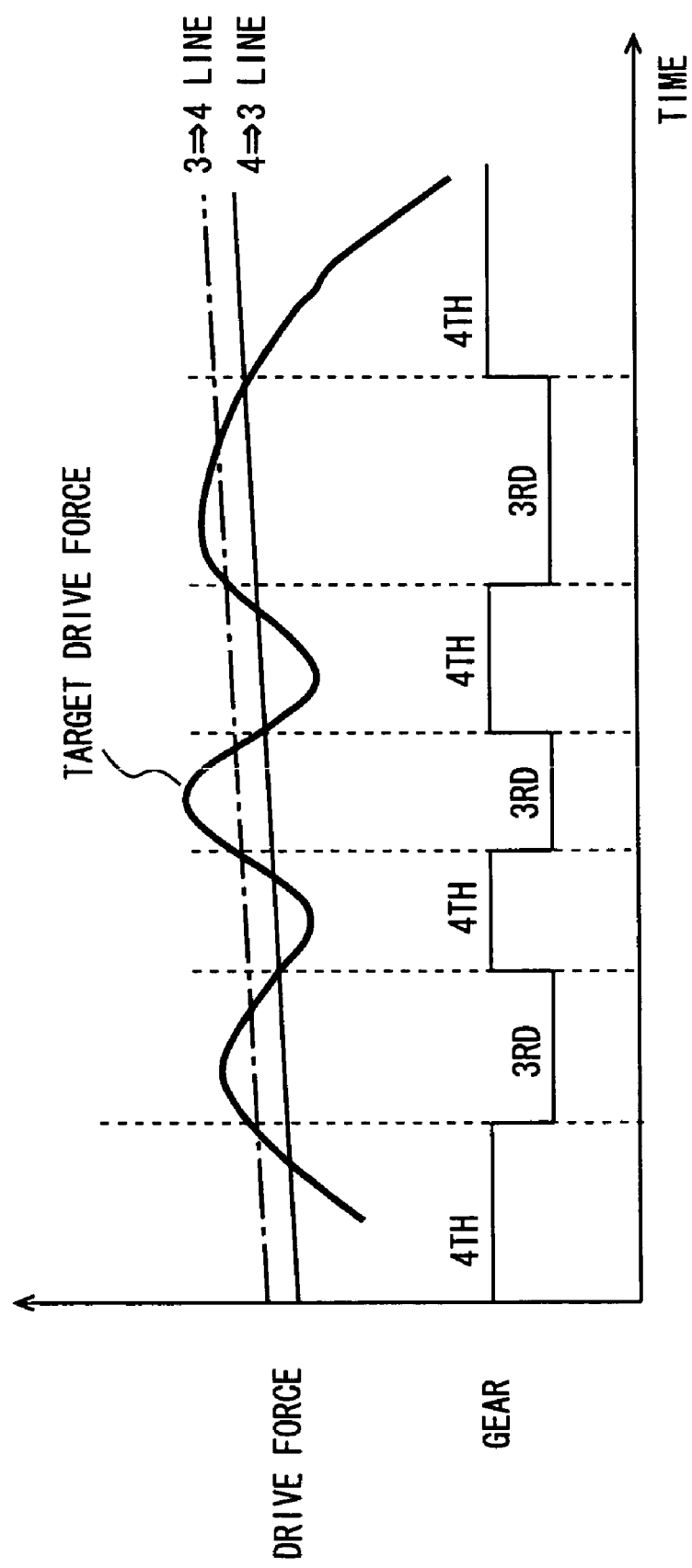
FIG. 20 is a timing chart (first) showing changes of the drive force and the gear.
Figure 21:
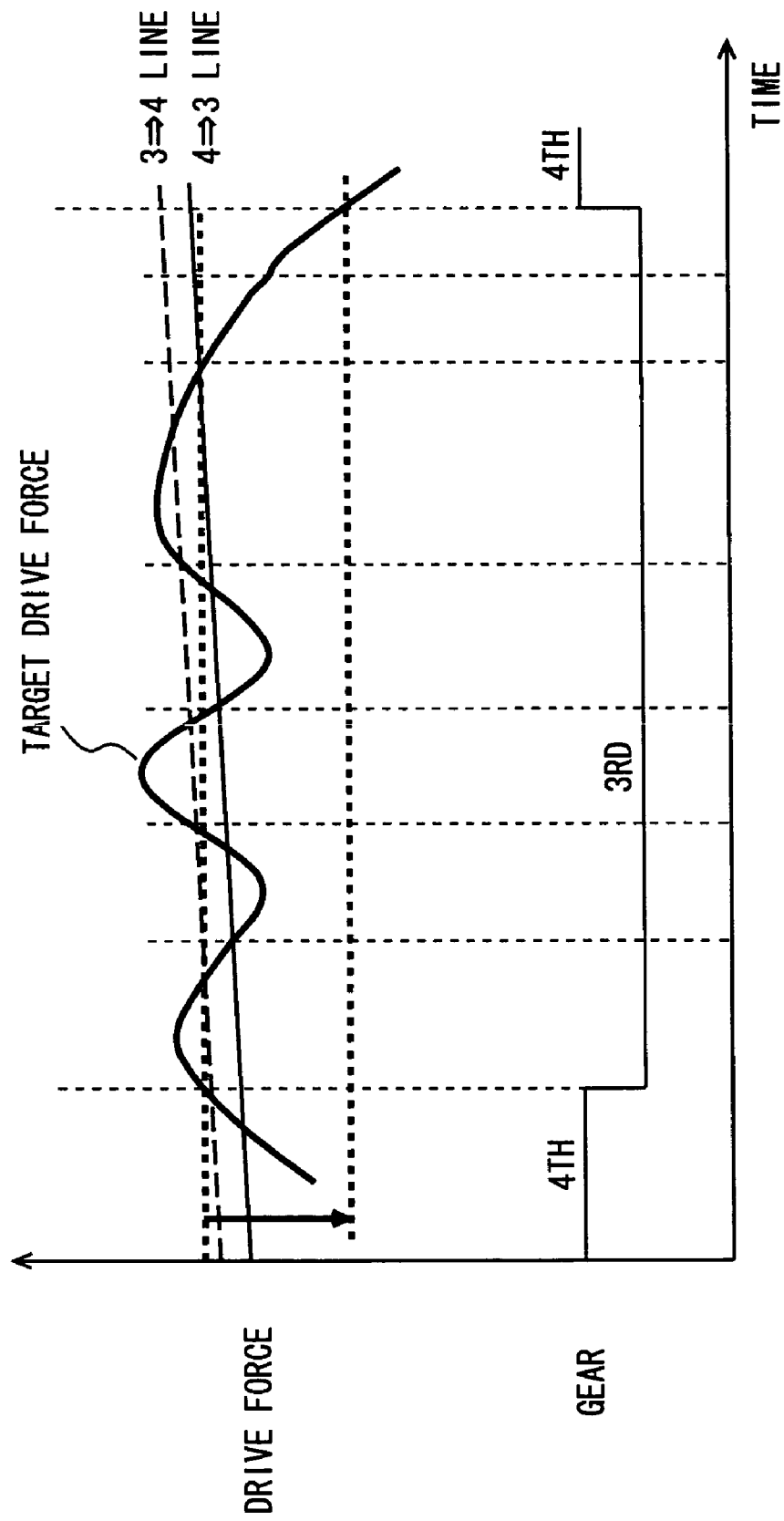
FIG. 21 is a timing chart (second) showing changes of the drive force and the gear.

Conversely, during execution, e.g., of the cruise control that maintains the vehicle speed already set by the driver when the driver does not operate the accelerator pedal 8008, the drive force (target drive force) of the vehicle may increase or decrease as shown in FIG. 20. Therefore, the up-shift and the down-shift may be repeated frequently.

Therefore, the down-shift after the up-shift as well as the up-shift after the down-shift are inhibited (S204) when both the condition that the amount of change of the accelerator pedal position after the last gear shift is larger than the threshold and the condition that the amount of change of the drive force after the last gear shift is larger than the threshold are not satisfied (NO in S200).

When the condition that the amount of change of the accelerator pedal position after the last gear shift is larger than the threshold or the condition that the amount of change of the drive force after the last gear shift is larger than the threshold is satisfied (YES in S200), the down-shift after the up-shift and the up-shift after the down-shift are allowed (S202).

Thereby, the number of times of unnecessary gear shift can be reduced. Therefore, the gear that is appropriately set can be easily maintained. Consequently, the gear ratio of the automatic transmission can be finely controlled.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A gear shift system for a vehicle comprising:
   an automatic transmission; and
   a control unit,
   said control unit being adapted in such a manner as to detect a vehicle speed, a first information representing a driver's operation of an accelerator pedal or a brake pedal, and
   a second information representing a running environment of said vehicle, characterized in that
   said control unit sets a parameter having one of the detected vehicle speed, an accelerator pedal position and a throttle position as well as a drive force as components, wherein each of the accelerator pedal position, the throttle position and the drive force is set according to said first information and said second information,
   said control unit sets a gear ratio according to said parameter and a map determining the gear ratio based on one of the accelerator pedal position and the throttle position as well as the vehicle speed and the drive force, and has down shift lines at which shifting is carried out in dependence on the vehicle speed and the drive force, wherein the shift-down lines change in accordance with changes of the accelerator pedal position or the throttle position such that the drive force decreases with an increase of the accelerator pedal position or the throttle position, and
   controls said automatic transmission to shift the gear according to said set gear ratio.

2. A gear shift system for a vehicle comprising:
   an automatic transmission; and
   a control unit,
   said control unit being adapted to detect a vehicle speed,
   a first information representing a driver's operation of an accelerator pedal or a brake pedal, and
   a second information representing a running environment of said vehicle, characterized in that
   said control unit sets a parameter having one of a detected vehicle speed, an accelerator pedal position and a throttle position as well as drive force as components, wherein each of said accelerator pedal position, said throttle position and said drive force is set according to said first information and said second information, sets a gear ratio according to said parameter and a map determining the gear ratio based on one of the accelerator pedal position and the throttle position as well as the vehicle speed and the drive force, controls said automatic transmission to shift the gear according to said set gear ratio, allows down-shift after up-shift as well as the up-shift after the down-shift when at least one of a first condition that an amount of change of one of the accelerator pedal position and the throttle position after the last change of the gear ratio is larger than a threshold and a second condition that an amount of change of the drive force after the last change of the gear ratio is larger than the threshold is satisfied, and inhibits the down-shift after the up-shift as well as the up-shift after the down-shift when neither said first nor said second condition is satisfied.

3. A control method for an automatic transmission mounted on a vehicle, comprising the steps of:

detecting a vehicle speed;

detecting a first information representing a driver's operation of an accelerator pedal or a brake pedal;

detecting a second information representing a running environment of said vehicle;

setting a parameter using said control unit having one of the detected vehicle speed, an accelerator pedal position and a throttle position as well as a drive force as components, wherein each of said accelerator pedal position and said drive force is set according to said first information and said second information;

setting a gear ratio using said control unit according to said parameter and a map determining the gear ratio based on one of the accelerator pedal position and the throttle position as well as the vehicle speed and the drive force, and having shift-down lines at which shifting is carried out in dependence on the vehicle speed and the drive force, wherein said shift-down lines change in accordance with changes of the accelerator pedal position or the throttle position such that the drive force decreases with an increase of the accelerator pedal position or the throttle position; and controlling said automatic transmission to shift the gear according to said set gear ratio.

4. A control method for an automatic transmission mounted on a vehicle, comprising the steps of;

detecting a vehicle speed;

detecting a first information representing a driver's operation of an accelerator pedal or a brake pedal;

detecting a second information representing a running environment of said vehicle;

setting a parameter using said control unit having one of the detected vehicle speed, an accelerator pedal position and a throttle position as well as a drive force as components, wherein each of said accelerator pedal position and said drive force is set according to said first information and said second information;

setting a gear ratio using said control unit according to said parameter and a map determining the gear ratio based on one of the accelerator pedal position and the throttle position as well as the vehicle speed and the drive force;

controlling said automatic transmission to shift the gear according to said set gear ratio;

allowing down-shift after up-shift as well as the up-shift after the down-shift when at least one of a first condition that an amount of change of one of the accelerator pedal position and the throttle position after the last change of the gear ratio is larger than a threshold and a second condition that an amount of change of the drive force after the last change of the gear ratio is larger than the threshold is satisfied; and inhibiting the down-shift after the up-shift as well as the up-shift after the down-shift when neither said first nor said second condition is satisfied.

* * * * *

UNITED STATES PATENT AND TRADEMARK OFFICE
CERTIFICATE OF CORRECTION

PATENT NO. : 8,301,351 B2
APPLICATION NO. : 12/216421
DATED : October 30, 2012
INVENTOR(S) : Seiji Kuwahara et al.

Page 1 of 1

It is certified that error appears in the above-identified patent and that said Letters Patent is hereby corrected as shown below:

In the Claims:

Col. 15, Line 25, delete "said" and insert --A--.

Col. 16, Line 14, delete "said" and insert --A--.

Signed and Sealed this
Seventh Day of May, 2013

Teresa Stanek Rea
*Acting Director of the United States Patent and Trademark Office*